United States Patent
Burger et al.

(10) Patent No.: US 10,315,370 B2
(45) Date of Patent: Jun. 11, 2019

(54) METHOD, MOLD INSERT AND INJECTION MOLD FOR PRODUCING A PLASTICS MOLDING

(71) Applicants: LEONHARD KURZ Stiftung & Co. KG, Furth (DE); OVD Kinegram AG, Zug (CH)

(72) Inventors: Harald Burger, Nuremberg (DE); Andreas Schilling, Hagendorn (CH); Volker Dinkelmeyer, Ellingen (DE); Sebastian Mader, Baar (CH)

(73) Assignees: LEONHARD KURZ STIFTUNG & CO. KG, Furth (DE); OVD KINEGRAM AG, Zug (CH)

( * ) Notice: Subject to any disclaimer, the term of this patent is extended or adjusted under 35 U.S.C. 154(b) by 401 days.

(21) Appl. No.: 15/024,108

(22) PCT Filed: Sep. 25, 2014

(86) PCT No.: PCT/EP2014/070573
§ 371 (c)(1),
(2) Date: Mar. 23, 2016

(87) PCT Pub. No.: WO2015/044314
PCT Pub. Date: Apr. 2, 2015

(65) Prior Publication Data
US 2016/0229137 A1   Aug. 11, 2016

(30) Foreign Application Priority Data
Sep. 27, 2013  (DE) .................. 10 2013 110 702

(51) Int. Cl.
*B29D 11/00*  (2006.01)
*B29C 45/26*  (2006.01)
(Continued)

(52) U.S. Cl.
CPC .... *B29D 11/00769* (2013.01); *B29C 45/1756* (2013.01); *B29C 45/263* (2013.01);
(Continued)

(58) Field of Classification Search
CPC .......... B29D 11/00769; B29D 11/0048; B29C 45/2675; B29C 45/372; B29C 45/1756; B29C 45/263
See application file for complete search history.

(56) References Cited

U.S. PATENT DOCUMENTS 4,747,981 A   5/1988  Robinson
5,538,674 A   7/1996  Nisper et al.
(Continued)

FOREIGN PATENT DOCUMENTS

CN   1458876    11/2003
DE   10333370   2/2005
(Continued)

OTHER PUBLICATIONS

Japanese Office Action for corresponding Japanese Patent Application No. 2016-517344, dated Oct. 23, 2018, pp. 1-7.

*Primary Examiner* — Mathieu D Vargot
(74) *Attorney, Agent, or Firm* — Hoffmann & Baron, LLP (57) ABSTRACT

Method for producing a plastic molded part (1), wherein, in the method, a mold insert (3) with a diffractive surface relief (32) is provided, the mold insert (3) is inserted into one mold half of an injection mold (5) which, together with at least one further mold half, forms a cavity for producing the plastic molded part (1), wherein the mold insert (3) is inserted into the injection mold (5) such that the diffractive surface relief (32) forms a partial area of the surface of the cavity formed by the mold half (5), and the plastic molded part (1) is molded by injection molding by means of the injection mold (5). The invention furthermore relates to a mold insert as
(Continued)

well as an injection mold for such a method, as well as a plastic molded part produced in this way.

15 Claims, 3 Drawing Sheets

(51) Int. Cl.
*B29C 45/37* (2006.01)
*B29C 45/17* (2006.01)
*B29L 11/00* (2006.01)
*B29L 31/00* (2006.01)

(52) U.S. Cl.
CPC ........ *B29C 45/2675* (2013.01); *B29C 45/372* (2013.01); *B29D 11/0048* (2013.01); *B29K 2905/08* (2013.01); *B29K 2995/0018* (2013.01); *B29K 2995/0025* (2013.01); *B29K 2995/0026* (2013.01); *B29L 2011/00* (2013.01); *B29L 2031/747* (2013.01)

(56) References Cited

U.S. PATENT DOCUMENTS

| | | |
|---|---|---|
| 2002/0134751 A1 | 9/2002 | Kawashima et al. |
| 2003/0017581 A1* | 1/2003 | Li .................... G01N 21/7743 |
| | | 435/287.2 |
| 2005/0052742 A1 | 3/2005 | Brinkmann et al. |
| 2005/0285287 A1 | 12/2005 | Okumura et al. |
| 2012/0002289 A1 | 1/2012 | Shin et al. |

FOREIGN PATENT DOCUMENTS

| | | |
|---|---|---|
| EP | 0878291 | 11/1998 |
| JP | 2006044247 A | 2/2006 |
| JP | 2008173914 A | 7/2008 |
| JP | 2010036515 A | 2/2010 |
| JP | 201214138 A | 1/2012 |
| WO | WO9313933 | 7/1993 |
| WO | WO9616794 | 6/1996 |
| WO | WO03006226 | 1/2003 |
| WO | WO2012006637 | 1/2012 |

* cited by examiner

METHOD, MOLD INSERT AND INJECTION MOLD FOR PRODUCING A PLASTICS MOLDING

This application claims priority based on an International Application filed under the Patent Cooperation Treaty, PCT/EP2014/070573, filed on Sep. 25, 2014, and German Application No. DE 102013110702.8, filed on Sep. 27, 2013.

BACKGROUND OF THE INVENTION

The invention relates to a method, a mold insert, a holding device and an injection mold for producing a plastic molded part, as well as a plastic molded part produced in this way.

It is known to use injection molds for producing optical components made of plastic.

For example EP 0 878 291 A1 discloses an injection mold for producing diffractive lenses. The injection mold comprises two mold halves which form a lens-shaped cavity. One of the mold halves has a recess into which a die can be inserted. The die then forms the entire surface of the cavity formed by this mold half and bears, on its side facing the cavity, a structure which, during injection molding, is molded into the plastic molded part.

SUMMARY OF THE INVENTION

The object of the present invention is to provide a method, a mold insert and an injection mold by means of which any plastic molded parts can be equipped with additional optical effects by injection molding. Furthermore, an object of the present invention is to provide such a plastic molded part.

This object is achieved by a method, a mold insert, a holding device, an injection mold and a plastic molded part as described herein.

In the method for producing a plastic molded part a mold insert with a diffractive surface relief is provided, the mold insert is inserted into one mold half of an injection mold which, together with at least one further mold half, forms a cavity for producing the plastic molded part. The mold insert is inserted into the injection mold such that the diffractive surface relief forms a partial area of the surface of the cavity formed by the mold half. The plastic molded part is then molded by injection molding by means of the injection mold.

As a rule, injection molds comprise two mold halves which together form the cavity. However, multi-part molds are also conceivable. Even in the case of molds with more than two parts which together form the cavity, the respective parts are referred to as mold halves here.

By the cavity of the injection mold is meant here the cavity of the injection mold that is complementary to the molded part to be produced and in which the plastic molded part is molded. Further cavities of the injection mold, such as for example the gating system, are not understood here as a constituent of the cavity.

The mold insert comprises a diffractive surface relief and can be inserted into one mold half of an injection mold which, together with at least one further mold half, forms a cavity for producing the plastic molded part, in such a way that the diffractive surface relief forms a partial area of the surface, formed by the mold half, of the cavity of the injection mold.

The injection mold for producing a plastic molded part comprises at least one mold half which, together with at least one further mold half, forms a cavity for producing the plastic molded part, wherein the mold half has a receiver into which a mold insert with a diffractive surface relief can be inserted such that the diffractive surface relief forms a partial area of the inner surface, formed by the mold half, of the cavity of the injection mold.

A plastic molded part produced by means of the described method using the described injection mold and the described mold insert comprises a diffractive surface relief which extends over only a partial area of a surface of the plastic molded part.

In the manner described, it is possible to obtain plastic molded parts which comprise diffractive optical elements but are not necessarily designed as optical components. The partial areas of the surface not covered with the diffractive surface relief can thus assume further functions. The diffractive surface relief can thereby be used for example also only for decorative purposes, purposes of protection against forgery, or as an inscription. Furthermore, the partial areas of the surface not covered with the diffractive surface relief are thus also available for other optical functions. Thus, for example, a decorative diffractive element can be combined with other, non-diffractive elements, such as e.g. retroreflectors or the like. It is likewise possible to decorate the partial areas of the surface not covered with the diffractive surface relief during the injection molding process, for example with IMD films or IML labels (IMD=In Mold Decoration; IML=In Mold Labeling) or to decorate them in another way in a subsequent process step and/or to provide them with further functional coatings. Likewise, the partial areas of the surface not covered with the diffractive surface relief can also be formed, in a multi-component injection molding, from another injection molding material which, in particular, is not transparent. Likewise, it is possible that the partial areas of the surface not covered with the diffractive surface relief are high-gloss and smooth, and are thus preferably highly transparent and clearly see-through.

The partial areas of the surface covered with the diffractive surface relief are not smooth or high-gloss due to the surface relief and therefore form an optical contrast to, for example, adjacent high-gloss, smooth surfaces. This contrast can be desired in some practical cases, and not desired in others. In cases where it is not desired, the contrast can be somewhat concealed for example by transition areas between the diffractive surface relief and the adjacent high-gloss, smooth surfaces, wherein the transition areas are slightly structured and/or have a diminishing structuring, diminishing towards the high-gloss, smooth surface.

As mold insert, a mold insert is preferably provided the diffractive surface relief of which is formed by an additive or subtractive superimposition of a diffractive microstructure and an in particular curved macrostructure. The macrostructure can be formed as a macroscopic curvature or generally as a free-form surface molded as desired, on which the diffractive microstructure is arranged.

The macrostructure preferably corresponds to the surface structure defined by the opposite surface of the plastic molded part. The macrostructure is preferably selected such that the distance between the notional macroscopic surface of the plastic molded part defined by the macrostructure and the opposite surface of the injection molded part, at least in a non-level area of the diffractive surface relief, is substantially constant and preferably varies by not more than ±20%, further preferably by not more than ±10%. For example, in the case of a component 2 mm to 3 mm thick the wall thickness thus varies by not more than 0.4 mm. A largely constant wall thickness of the injection molded part is thus achieved, whereby it is possible to achieve a sufficiently good stability in all areas. Thus no weak points or predetermined breaking points form. Correspondingly, the opposite wall surfaces of the cavity of the injection mold are also substantially constantly spaced apart, at least in the area of the mold insert, with the result that the plastic molded part can be manufactured by means of the method described.

The diffractive microstructure can thereby be incorporated into surfaces molded as desired. In particular it is thereby possible to introduce a diffractive structure into an existing component, without the shape of the latter having to be adapted or specifically modified. A particular advantage is that, in contrast to known methods and injection molds, it is here made possible to introduce the diffractive microstructure into curved surfaces. Thus no flat or level area has to be provided if a diffractive microstructure is to be incorporated into a component. Design freedom in the development of plastic molded parts with diffractive surface reliefs is thus not limited.

Major modifications to existing injection molding tools are also unnecessary, it is only necessary to provide and insert the corresponding mold insert. This enables a particularly high degree of planning flexibility and low conversion costs if an existing component is to be provided with a diffractive microstructure in the future.

By microstructures is preferably meant here structures the structural elements and/or local minima or maxima of which have an average spacing of less than 500 µm, preferably less than 100 µm, further preferably less than 10 µm.

A diffractive microstructure preferably has a spatial frequency of more than 100 lines/mm, preferably more than 300 lines/mm, further preferably between 800 lines/mm and 2800 lines/mm. The relief depth of the diffractive microstructure is preferably between 50 nm and 100 µm, further preferably between 200 nm and 10 µm.

The diffractive microstructure is preferably a 2D/3D hologram, a kinoform, a Fourier hologram, a computer-generated hologram (CGH) specifically calculated corresponding to the optical function, or a KINEGRAM® or TRUSTSEAL® consisting of one- or two-dimensional periodic diffraction gratings, isotropic or anisotropic mat structures (with a statistical variation of the structure parameters), asymmetrical blazed gratings with continuous or stepped phase function (in particular 2, 4 or 8 steps), lens-like structures, or a structure combining one or more of the above-named structures.

With respect to its relief parameters, in particular spatial frequency and relief depth, the microstructure is preferably designed such that in reflected light observation and/or transmitted light observation an optically variable effect is generated, which becomes visible to the human observer, optionally with the aid of a specific light source (LED, laser pointer, point light source with a predetermined spacing etc.), when the microstructure is molded into a preferably transparent plastic material preferably with a refractive index of from approx. 1.5 to 1.6.

By macrostructures is preferably meant structures the structural element and/or local minima or maxima of which are spaced apart from each other by more than 10 µm, preferably more than 50 µm, further preferably between 100 µm and 500 µm. The relief depth of the macrostructures is preferably more than 0.5 µm, further preferably more than 5 µm.

It is further expedient if, as mold insert, a mold insert is provided the macrostructure of which describes a free-form surface which is curved, at least in areas, with one or more curvatures, wherein the one or more curvatures in each case have a radius of curvature which is at least 100 times and at most 0.1 times, preferably at least 10 times and at most 0.25 times, particularly preferably at least 5 times and at most 0.33 times the lateral extent of the diffractive surface relief, and/or the one or more curvatures in each case have a radius of curvature in the range of from 10,000 mm to 10 mm, preferably from 1000 mm to 25 mm, particularly preferably from 500 mm to 33 mm, in particular in the case of a lateral extent of 100 mm. However, larger radii of curvature, i.e. flatter free-form surfaces, are also possible. The local macroscopic curvatures of the diffractive surface relief are predetermined substantially by the external shape of the component, derived from the requirement for a constant wall thickness of the component.

By the lateral extent of the diffractive surface relief is meant the greatest distance between two points lying on the edge curve of the surface relief, i.e. for example the diameter in the case of a circular surface relief or the length of the diagonal in the case of a rectangular surface relief. In addition to a circle shape or a rectangle, any differently molded contours of the surface relief are also possible, in particular in order to enable an artistically appealing incorporation of the surface relief into the component. For example, the contour of the surface relief can be a polygon or can be delimited in areas by continuous convex and/or concave curves, in particular by means of mathematical function curves.

In the case of such above-named radii of curvature, the diffractive microstructure can be superimposed with the macrostructure without difficulty, without this resulting in distortions of the desired diffractive effect that cannot be corrected.

During the provision of the mold insert, first a provisional diffractive surface relief is preferably formed in a surface of a substrate, in particular into a flat metal part, and then the substrate is reshaped to form the mold insert, wherein, during the reshaping, the provisional surface relief is deformed into the diffractive surface relief of the mold insert.

Known methods for introducing surface reliefs into flat components can thus be used, without their having to be adapted for curved surfaces.

The substrate is preferably reshaped by deep drawing. It is expedient if, for the deep drawing, a tool is used the hardness of which is less than a hardness of the material of the substrate. It is hereby ensured that the diffractive microstructure is not damaged by the deep drawing tool.

It is advantageous if, for forming the provisional surface relief, first a master element, in particular comprising a photoresist, into which the provisional surface relief is molded is provided and then the substrate is molded by the master element.

As soon as such a master element is provided, a number of substrates can thus be easily produced as copies of the master element. This simplifies production compared with the direct introduction of the provisional surface relief into each individual substrate. In particular the direct introduction of microstructures into photoresists is much easier than the direct introduction of microstructures into metallic substrates.

The provisional surface relief is preferably introduced, by lithography processes such as laser-beam lithography or electron-beam lithography or by illumination by means of a mask and UV illumination, into the master element and/or into the substrate, as a rule a radiation-sensitive photoresist layer (in this case by illumination and subsequent development). This enables a particularly rapid and flexible molding of the provisional surface relief.

The provisional surface relief is preferably introduced into the master element and/or the substrate as a computer-generated hologram (specifically calculated) and/or as a kinoform (specifically calculated) and/or as a Fourier hologram (holographically recorded).

After the molding of the provisional surface relief, the substrate is preferably produced by galvanic deposition of a metal, in particular nickel, onto the master element. The provisional surface relief can hereby be transferred, in high quality, from the master element to the harder metal substrate. For this, the master element is, expediently, first made conductive, for example by application of a conductive varnish. The metal can then be deposited by application of a voltage to the thus-coated master element in a galvanizing bath.

The layer thickness of the thus-deposited substrate is preferably 0.05 mm to 1 mm. Such substrates are, on the one hand, durable enough to be able to be used in mold inserts for injection molding but, on the other hand, also thin enough to be reshaped by deep drawing without difficulty.

For molding the provisional surface relief, a correction function K is preferably ascertained, and applied to a function F1 describing the diffractive effects to be achieved, in order to determine a function F2 describing the provisional surface relief.

It is thus possible, for example, for the correction function K to characterize the modification or distortion of the provisional surface relief during deformation and, for example, to thus define the macroscopic surface profile which is brought about by the deformation during deformation of a level surface profile.

From the function F1 describing the diffractive effects to be achieved, for one thing the microstructure M to be molded for this can thus first be determined, and furthermore this microstructure can be pre-distorted according to the correction function K, such that the deformation brought about by the reshaping is balanced out again.

If, for example, the correction function K thus describes the modification, brought about by the deformation, of a level surface by means of a corresponding distortion matrix, F2 can be determined for example as follows:

$$F2 = K^{-1} * M(F1)$$

Furthermore, for this, the ascertained microstructure M can for example be (multiplicatively) superimposed with a macrostructure which is described by the inverse correction function and which for example represents the inverse molding to the deformation of a smooth surface brought about by the deformation (macrostructure).

Preferably, it is further possible for a correction function K to be ascertained, which describes the optical effects brought about by the deformation, or specifies an optical function which is necessary to at least partially balance out the optical effects brought about by the deformation. If, for example, the substrate is thus spherically deformed by the reshaping, the correction function K can for example describe the optical function of a corresponding spherical lens or inverted spherical lens.

It is thus expedient if the correction function K describes or at least partially balances out the modification of the diffractive effects of the provisional surface relief due to the later deformation of the provisional surface relief by the reshaping.

This correction function K is preferably applied to the function F1 describing the diffractive effects to be achieved here, such that the diffractive effects are calculated which, taking into account the optical effects described by the correction function K, achieve the diffractive effects to be achieved according to F1 and the provisional surface relief is then ascertained from this.

This can for example be realized during holographic generation of the provisional surface relief, in that a corresponding lens/lens system which yields the optical function of the correction function is introduced into the object beam or reference beam.

The function F1 thus describes which optical effect is to occur in the finished plastic molded part. If the provisional surface structure were molded into the substrate on the basis of the function F1, then because of the deformation of the provisional surface structure during deep drawing the desired optical effect would possibly not be achieved in the finished plastic molded part, but for example a distorted hologram would be represented. This is avoided by the application of the correction function K to the function F1. The obtained function F2 thus describes which provisional surface structure has to be introduced into the substrate in order to obtain, after the deformation, a diffractive surface structure which produces the desired effect.

It is further advantageous if the mold insert is secured in the injection mold by means of a clamping element. This ensures that the mold insert is securely held during injection molding. The mold insert is preferably gripped by the clamping element on all sides and in particular held by non-positive locking and/or by positive locking.

It is furthermore expedient if the mold insert is held on an undercut of the injection mold. This also results in a securing by non-positive locking and/or positive locking, which can also bring the advantage that the mold insert fits flush with the surface of the cavity, with the result that there is no step on the finished plastic molded part.

Additionally or alternatively, the mold insert can also be adhered to the injection mold in order to guarantee a particularly secure hold.

For securing the mold insert, a corresponding receiver is preferably provided in the injection mold. It is expedient if, in this receiver, at least one die is provided, by means of which, when the mold insert is inserted, a predetermined contact pressure can be exerted on the side of the mold insert facing away from the cavity. This prevents the mold insert from sagging during the injection molding, which would lead to a deformation of the surface relief and thereby to the loss of the desired optical properties of the plastic molded part.

It is further expedient if the mold insert comprises at least one marking, with the aid of which the correct orientation of the mold insert is recognizable, when the latter is inserted in the injection mold. The orientation of the mold insert also determines the orientation of the desired optical effect. Depending on the type of the optical effect the correct orientation or alignment can be important. For particular optical effects, however, the orientation can also be as desired.

Alternatively to the direct fitting of the mold insert in the injection mold it is also possible to provide a holding device for the mold insert, which can be inserted into one mold half of an injection mold which, together with at least one further mold half, forms a cavity for producing the plastic molded part, such that the diffractive surface relief of a mold insert held in the holding device forms a partial area of the surface, formed by the mold half, of the cavity of the injection mold, wherein the holding device comprises an in particular cylindrical base body into which the mold insert is inserted. This simplifies the handling of the mold insert and protects it from damage, in particular as it no longer needs to be directly touched during fitting.

The base body preferably has at least one undercut for holding the mold insert and/or at least one adhesive flange for adhering the mold insert to the injection mold. Alternatively or additionally, a clamping element for holding the mold insert can also be provided. The securing of the mold insert in the base body thus corresponds to the above-described direct securing of the mold insert in the injection mold.

It is further advantageous if the holding device can be sealed by means of a cover. When the mold insert is fitted, the cover then seals one end face of the cylindrical base body, while the other end face is sealed by the mold insert. This results in a compact device which can easily be inserted into the injection mold and held there in a stable manner.

The remaining cavity inside the base body can be filled by means of a suitable die, with the result that the mold insert has no clearance for movement and is not deformed during the injection molding. Furthermore, stop elements can also be provided on the base body, which elements ensure that the base body can be fitted correctly positioned in the injection mold, or which elements form a stop for the mold insert, so as to ensure that it sits in the correct position.

A thus-produced plastic molded part is preferably formed from a transparent or opaque plastic, in particular PMMA, PET-G, ABS or PC.

Plastic molded parts of the described type are suitable for various applications. The plastic molded part can thus be, for example, a constituent of an illumination device, in particular for a motor vehicle. A motif that appears to be optically floating, e.g. a logo, symbol, pattern or the like, can be projected there by the diffractive surface relief. Such plastic molded parts can also be used in backlit switches or other control elements. Here, the diffractive surface element allows, for example, floating symbols to be displayed, which illustrate the function of the respective control element.

BRIEF DESCRIPTION OF THE DRAWINGS

The invention is explained by way of example below with reference to an embodiment example and the drawing. There are shown in.

DETAILED DESCRIPTION OF THE INVENTION

In order to mold a diffractive surface relief 2 into a plastic molded part 1, a mold insert 3 is inserted into a receiver 4 of an injection mold 5. The mold insert 3 has, on its surface 31 facing a cavity 51 of the injection mold in the inserted state, the surface relief 32 to be molded. After sealing of the injection mold 5, the cavity 51 is filled with the molding compound, with the result that the surface relief 32 is molded in the plastic molded part 1.

The surface relief 32 forms only a partial area of the surface 52 of the cavity 51. In other words a part of the surface 11 of the plastic molded part 1 remains smooth.

The diffractive surface relief 2 can be a computer-generated hologram, a Fourier hologram or a kinoform. In transmitted light it is thus possible to produce a floating image of a motif such as a symbol, logo, sign, picture or the like. The relief preferably has a spatial frequency between 100 lines/mm and 3000 lines/mm and/or a relief depth of from 100 nm to 10 µm.

Figure 1:
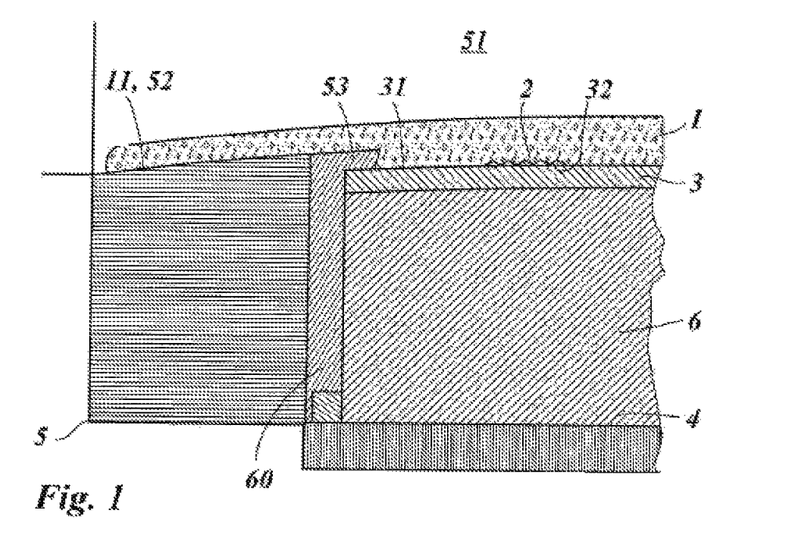
FIG. 1 An embodiment example of a mold insert, which is secured in an injection mold by means of a clamping.
Figure 2:
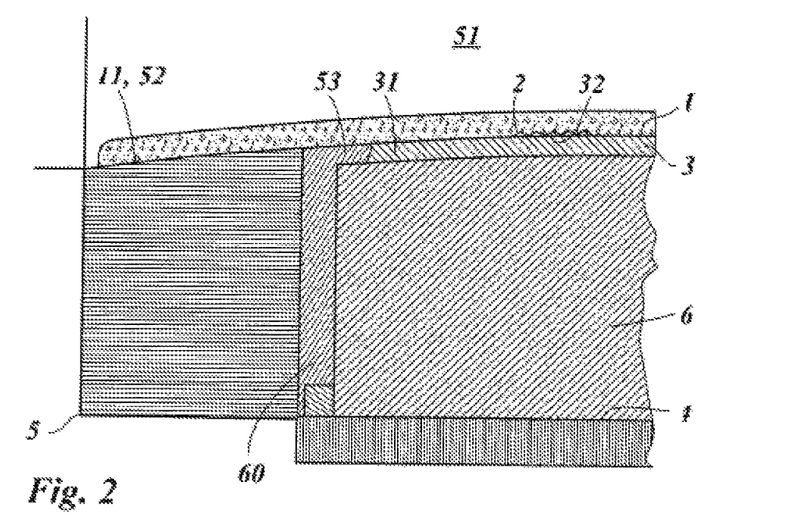
FIG. 2 An embodiment example of a mold insert, which is secured in an injection mold by means of an adhesive securing.

FIGS. 1 and 2 show different ways of securing the mold insert 3 in the injection mold 5. In the variant according to FIG. 1 the mold insert 3 is held by non-positive locking by a die 6 on an undercut 53 of a die sleeve 60. In the embodiment shown, between mold insert 3, a step or gap forms between the adjacent surface of the die sleeve 60 and the surface relief 32 on the mold insert 3. In the variant according to FIG. 2, the mold insert 3 is secured in the die sleeve 60 by means of an undercut, by positive locking and advantageously fitting flush with the adjacent surface of the die sleeve 60, and additionally adhered to the die 6. This securing by means of an undercut has the advantage that, unlike in the variant according to FIG. 1, no gap which results in a step on the plastic molded part 1 remains. The additional adhesion leads to an even better fixing of the mold insert 3 on the die 6. The die sleeve 60 receiving the die 6 is inserted in the receiver 4 of the injection mold 5 and secured there, preferably screwed.

Figure 5:
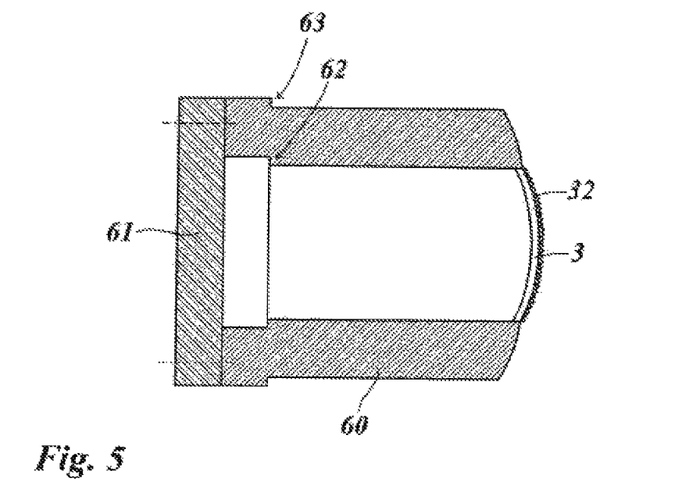
FIG. 5 A schematic representation of a die with a mold insert.

FIG. 5 shows the die 6 with the mold insert 3 secured thereon. The die 6 is formed such that it can be inserted, so that it fits into a correspondingly molded die sleeve 60. For this, on its underside the die 6 has a stop 62, in order that the die 6 sinks into the die sleeve 60 only up to a desired depth and the mold insert 3 on the opposite side thereby interacts with the adjacent surface of the die sleeve 60 in the desired manner. The die sleeve 60 is sealed, in particular screwed, with a cover 61 on the underside, in order to also secure the die 6 in the die sleeve 60. The die sleeve 60 is then inserted into the receiver 4 in the injection mold 5 and secured there in turn by means of screwing. The die sleeve 60 also has a stop 63, so as to sink into the receiver 4 of the injection mold 5 only up to a desired depth and, in the cavity 51, to interact with the adjacent surface of the cavity 51 as desired.

The tolerance or clearance between receiver 4 and die sleeve 60 and between die sleeve 60 and die 6 is preferably approximately 0.01 mm to 0.05 mm, in particular 0.02 mm to 0.03 mm.

For the production of the mold insert 3 a flat master is first produced, which comprises a layer of a photoresist. A provisional surface relief 7 is imprinted into this layer. This can be effected for example by means of a laser or electron beam or by illumination with a mask. This makes it possible to achieve a detail resolution of approximately one micrometer. Single or multiple exposures are possible, which can in particular result in two-, four- or eight-step surface profiles. The photoresist is then developed, with the result that the provisional surface relief is formed.

The photoresist is then coated with a conductive varnish. In a galvanizing bath an electrical voltage is applied to the conductive varnish layer and a metal, preferably nickel, is deposited on the master. The layer thickness is 0.05 mm to 1 mm. The thus-produced metal body now also has the provisional surface relief. Copies of this metal body can in turn be prepared galvanically.

Figure 3:
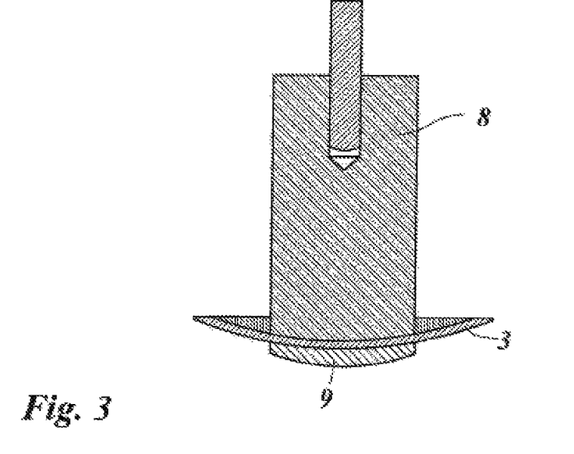
FIG. 3 An embodiment example of a mold insert during the reshaping by deep drawing.

In order to be able to provide plastic shaped bodies 1 molded as desired, with a diffractive surface structure 2, this metal body now has to be adapted to the shape of the plastic shaped body to be produced. As FIG. 3 shows, this is effected by deep drawing. Here the metal body is deformed between a die 8 and a counterholder 9, until it obtains the desired shape. The thus-obtained mold insert 3 can optionally be yet further cut and provided with securing elements. For die 8 and counterholder 9 a material is used which is softer than the metal body. If this consists of nickel, deep drawing tools made of steel, for example, are used. The provisional surface relief 7 is not damaged thereby.

In the case of deep drawing, curved surfaces with radii of curvature which are at least 100 times and at most 0.1 times, preferably at least 10 times and at most 0.25 times, particularly preferably at least 5 times and at most 0.33 times the lateral extent of the diffractive surface relief can be produced. The radii of curvature can lie in the range of from 10,000 mm to 10 mm, preferably from 1000 mm to 25 mm, particularly preferably from 500 mm to 33 mm, in particular in the case of a lateral extent of 100 mm.

For surface reliefs 2 with a diameter of 50 mm, for example, deep drawing of 4.8 mm can be achieved in the case of a thickness of the mold insert 3 of from 0.5 mm to 1 mm, or deep drawing of 2.4 mm can be achieved in the case of a thickness of the mold insert 3 of 0.5 mm. In the case of a diameter of the surface relief 2 of 100 mm, deep drawing of 10 mm can for example be achieved in the case of a thickness of the mold insert 3 of 0.5 mm.

Figure 6:
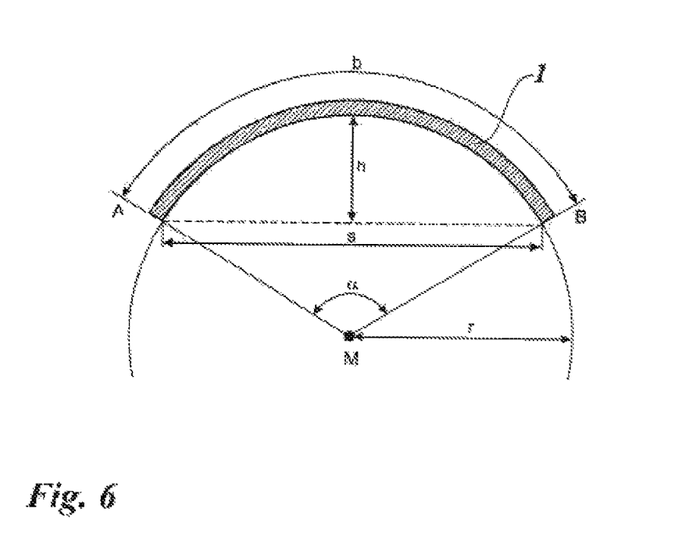
FIG. 6 A schematic representation of the curvature geometry of an embodiment example of a mold insert.

The relationship between the height h of the peak of the resulting surface above a notional base plane of the mold insert 3 and the radius of curvature r is represented in FIG. 6 for a simple spherical reshaping geometry. In the case of a lateral extent s of the curved area there results a radius of curvature of $$r = \frac{4h^2 + s^2}{8h}.$$

Thus, in the case of a diameter of the surface relief of 100 mm and a drawing depth h of 11 mm a radius of curvature of approx. 119 mm results, in the case of a drawing depth of 33 mm a radius of curvature of 54 mm results. However, in the case of more complex free-form surfaces this simple relationship does not necessarily apply.

The provisional surface relief 7 is deformed by the deep drawing and thus modifies its optical properties. This must be taken into account in the design of the provisional surface relief 7. For this reason, a provisional surface relief 7 has to be produced, which results in the desired diffractive surface relief 2 after the deformation.

In order to achieve this, a function F1 is first ascertained, which expresses the desired diffractive effect. Such functions can for example be calculated and represented as follows:

The calculation method for the CGH (CGH=Computer-Generated Hologram) is based on the point light source principle, wherein the element to be projected (e.g. star) is broken down into self-luminous point light sources, and a hologram is then calculated for each of these point light sources. The entire hologram is then calculated from the superposition of all the individual holograms. The thus-resulting total phase function is converted to a diffractive phase function for the design wavelength (e.g. red LED, wavelength 640 nm). Depending on the resolution of the method of lithography used for producing the diffractive surface relief based on the resulting diffractive phase function, for example laser-beam lithography with a resulting "minimum feature size" of approx. 1 μm, the diffractive surface relief is then approximately imprinted into a photoresist system. The "minimum feature size" here determines the smallest possible structure sizes and thus the largest possible diffractive diffraction angles or largest possible additional focus functions.

Further, a correction function K is ascertained, which characterizes the modification of the provisional surface relief during the deformation or the optical effect brought about by the deformation.

In the case of a simple spherical curvature geometry of the mold insert 3, for example a correction function K, in the form of a correspondingly conversely molded spherical curvature geometry, results.

The correction function K is applied in the calculation of the diffractive total phase function by means of CGH such that a correction phase function formed conversely to the curvature geometry of the mold insert 3 is taken into account.

The correction is particularly simple if the symmetry of the curvature of the mold insert 3 is matched to the symmetry of the motif to be represented by the diffractive surface relief 2. For example, a rotationally symmetrical motif and a correspondingly similar rotationally symmetrical curvature of the mold insert 3 can be superimposed such that the two centers of symmetry lie one above the other. A specific example is a curvature in the form of a spherical sector and a motif in the form of a star. The center of the spherical sector and the center of the star preferably lie one above the other. Distortions of the star due to the additional curvature thereby remain optically largely unproblematic and influence or impair the optical effect only very slightly. In other specific cases it is possible, by analyzing the symmetry of the curvature and of the motif, to find similar solutions in which the curvature only slightly interferes with the desired optical effect.

Critical variables in the correction of the distortion are in particular the radius of curvature R of the diffractive surface relief 2, the lateral extent Ld of the diffractive surface relief 2, the lateral extent Li of the intensity pattern projected in transmission and the divergence angle of the light source. For practically relevant cases it can be assumed that Ld approximately corresponds to Li. Within the range Ld/R<=2 a correction is possible without difficulty.

By applying the correction function K to the function F1 it is possible to calculate a further function F2 which represents the provisional surface relief 7. If the thus-calculated provisional surface relief 7 is introduced into the metal body, a diffractive surface relief 2 which shows the desired diffractive effect is obtained in the finished mold insert 3 and thus also in the plastic molded part 1.

In the calculation of the surface reliefs 2 and 7 yet further parameters which are important for the desired intended use of the plastic molded part 1 can furthermore be taken into account. If the plastic molded part is to be attached, for example, to an illumination device, with the result that an optically floating symbol is produced in transmitted light, observation distance, observation angle, distance from the light source, divergence angle of the light source and any remaining focusing optics can also be taken into account here. A focusing function of its own can also be computationally incorporated into the diffractive surface relief 7. Particularly good results are achieved by a combination of an incorporated focusing function with a partial focusing by external optics. The divergence angle (half angle) of the light source should lie within the range of from 5° to 60°.

After the mold insert 3 has been produced in the described manner and inserted into the injection mold, the plastic molded part 1 can be produced by injection molding. If the diffractive effect is to be visible in transmitted light, transparent plastics, such as for example PMMA (transmittance 92%), PET-G (transmittance 91%), ABS (transmittance 85%) or PC (transmittance 88%), must be used. However, it is also possible to introduce surface structures which can be observed in reflected light and which can be used with opaque or semitransparent plastics or in the insert-molding method. It is to be borne in mind here that the structure depths of the diffractive surface relief must be many times greater for elements in transmission than for elements that work in reflection. For example structure depths of the diffractive surface relief for elements in transmission are approximately 0.5 μm to 3 μm and the structure depths of the diffractive surface relief for elements in reflection are approximately 0.1 μm to 0.5 μm. In addition, such opaque plastics can advantageously contain a reflection-enhancing layer in order to increase the visibility and brilliance of the optical effect of the diffractive surface relief.

Pressures of 800 bar to 2000 bar and temperatures between 220° C. and 320° C. usually occur during injection molding. The described mold insert 3 withstands such conditions without difficulty. At the most it needs to be changed after approximately 10,000 to 50,000 molding operations, in particular within the framework of a usual maintenance of the injection molding tools which is also otherwise necessary.

The use of the mold insert 3 does not have a disadvantageous influence on the cycle time of the molding operation. This depends predominantly on the geometry and size, as well as on the wall thickness of the plastic molded part 1, because the cooling time of the injection molding material is determined by these sizes, in particular above all by the wall thickness. The cycle time of the molding operation is usually between 5 seconds and 180 seconds, in particular between 10 seconds and 180 seconds.

Figure 4:
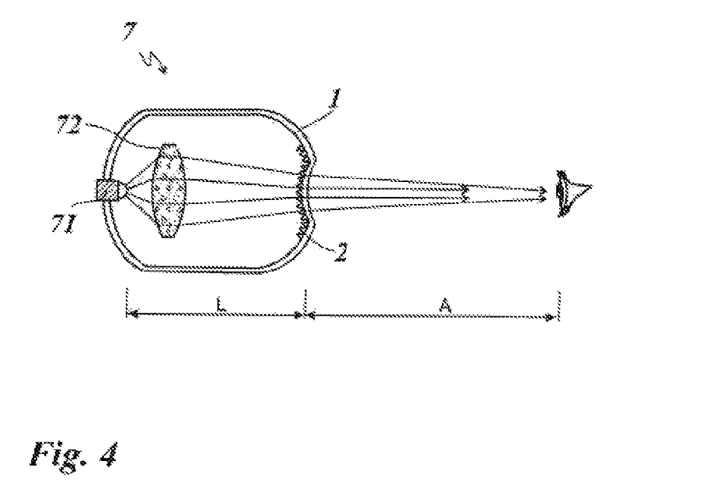
FIG. 4 A schematic representation of a plastic molded part in operation.

FIG. 4 shows a plastic molded part 1 according to the invention in operating position, i.e. with a light source 7, here an LED (LED=Light Emitting Diode) with an optical focusing element, here a double-convex converging lens 8. The diffractive surface relief 2 is thereby transilluminated by means of light which, by means of the focusing element, has the desired divergence. Light source 7 and diffractive surface relief 3 are arranged at a distance L. The distance L is preferably approximately 0.5 cm to approximately 10 cm. Due to the light transmitted through the diffractive surface relief 2 an optical effect 73 is produced which is recognizable at the observation distance A with the naked human eye, i.e. without further aids. The observation distance A is preferably approximately 20 cm to 500 cm. However, the effect 73 is also visible outside this range.

In order to produce the specifically shown effect 73, a five-pointed star, a quasi-continuous, diffractive phase function which results in diffractive relief structures with the smallest local grating periods of from approx. 5 μm to 10 μm and structure depths of from approx. 1 μm to 1.5 μm is calculated as a computer-generated hologram. As already described, the diffractive surface relief 2 includes the remaining correction, of the beam path of the light, necessary for the desired divergence of the light or the desired optical effect, wherein this correction is adapted to the course of the macrostructure (in this example the component curvature is a spherical deformation).

Thus the lighting device 7 shown in FIG. 4 results. A red LED with a divergence angle (half angle) of 45 degrees is used as light source 71 for the illumination or backlighting of the transparent plastic material of the plastic shaped body 1. For the production of approximately collimated light or for reducing the divergence angle of the LED light, with the result that the light is adapted to the course of the macrostructure, the additional focusing optics 72 are formed as a convex lens with a focal length of 40 mm and a diameter of 20 mm. The distance between the LED 71 and the focusing optics 72 is 10 mm, the distance between the focusing optics 72 and the diffractive surface relief 2 is approx. 40 mm.

In the area of the diffractive surface relief 2 the surface of the plastic molded part 1 forms a spherical shell with a 120 mm radius of curvature. The diffractive surface relief 3 is circular with a diameter of approximately 35 mm. An optical effect 73 results which is in the form of a star with a size of approx. 30 mm×30 mm and which, viewed by the observer, appears to lie approx. 5 cm to 10 cm behind the diffractive surface structure 2. The ideal observer distance is approx. 4 m to 5 m in front of the diffractive surface structure 2; the observer can be positioned slightly offset relative to the optical axis, e.g. slightly raised or also lower.

Various plastic molded parts 1 can be produced in the described manner. As the diffractive surface relief 2 can be arranged on any free-form surface, the design freedom is not impaired during design of the plastic molded part. In particular, diffractive effects can thus be incorporated into already existing designs without further modifications becoming necessary.

As the diffractive surface relief 2 occupies only a partial area of the surface 11 of the plastic molded part 1, still further optical or other functions can also be incorporated into the plastic molded part.

Possible applications are for example lighting devices which project optically floating motifs (appearing to lie in front of or behind the plane of the component), back-lit switches or control elements the function of which is displayed by an optically floating symbol, and the like.

The invention claimed is:

1. A method for producing a plastic molded part, wherein, in the method, a mold insert with a diffractive surface relief is provided, the mold insert is inserted into one mold half of an injection mold which, together with at least one further mold half, forms a cavity for producing the plastic molded part, wherein the mold insert is inserted into the injection mold such that the diffractive surface relief forms a partial area of the surface of the cavity formed by the mold half, and the plastic molded part is molded by injection molding by means of the injection mold, wherein, during the provision of the mold insert, first a provisional diffractive surface relief is formed in a surface of a substrate comprising a flat metal part, and then the substrate is reshaped to form the mold insert, wherein, during the reshaping, the provisional surface relief is deformed into the diffractive surface relief of the mold insert, wherein the substrate is reshaped by deep drawing.

2. A method according to claim 1, wherein the diffractive surface relief is formed by an additive or subtractive superimposition of a diffractive microstructure and a curved macrostructure.

3. A method according to claim 2, wherein the macrostructure describes a free-form surface which is curved, at least in areas, with one or more curvatures, wherein the one or more curvatures in each case have a radius of curvature which is at least 100 times and at most 0.1 times the lateral extent of the diffractive surface relief, and/or the one or more curvatures in each case have a radius of curvature in the range of from 10,000 mm to 10 mm.

4. A method according to claim 1, wherein for the deep drawing, a tool is used the hardness of which is less than a hardness of the material of the substrate.

5. A method according to claim 1, wherein for forming the provisional surface relief, first a master element, comprising a photoresist, into which the provisional surface relief is molded is provided and then the substrate is molded by the master element.

6. A method according to claim 1, wherein the provisional surface relief is molded, by lithography and/or by means of a laser or electron beam and/or by illumination by means of a mask, into a master element and/or into the substrate.

7. A method according to claim 1, wherein the provisional surface relief is molded into a master element and/or the substrate as a computer-generated hologram and/or kinoform and/or Fourier hologram.

8. A method according to claim 5, wherein after the molding of the provisional surface relief, the substrate is produced by galvanic deposition of a metal comprising nickel onto the master element.

9. A method according to claim 8, wherein from the produced substrate, further substrates are produced by galvanic deposition of a metal comprising nickel.

10. A method according to claim 1, wherein the substrate is produced in a thickness of from 0.05 mm to 1 mm.

11. A method according to claim 1, wherein for molding the provisional surface relief, a correction function (K) is ascertained, and applied to a function (F1) describing the diffractive effects to be achieved, in order to determine a function (F2) describing the provisional surface relief.

12. A method according to claim 11, wherein the correction function (K) describes or at least partially balances out the modification of the diffractive effects of the provisional surface relief due to the later deformation of the provisional surface relief by the reshaping.

13. A method according to claim 1, wherein the mold insert is secured in the injection mold by means of a clamping element.

14. A method according to claim 1, wherein the mold insert is held on an undercut of the injection mold.

15. A method according to claim 1, wherein the mold insert is adhered to the injection mold.

\* \* \* \* \*